(12) United States Patent
Monastyrshyn

(10) Patent No.: US 10,051,253 B1
(45) Date of Patent: Aug. 14, 2018

(54) BINARIZATION OF A VIDEO STREAM

(71) Applicant: Snap Inc., Venice, CA (US)

(72) Inventor: Yurii Monastyrshyn, Odessa (UA)

(73) Assignee: Snap Inc., Venice, CA (US)

( * ) Notice: Subject to any disclaimer, the term of this patent is extended or adjusted under 35 U.S.C. 154(b) by 0 days.

(21) Appl. No.: 14/973,816

(22) Filed: Dec. 18, 2015

(51) Int. Cl.
*G06K 9/00* (2006.01)
*H04N 9/70* (2006.01)
*G06K 9/38* (2006.01)
*G06K 9/46* (2006.01)

(52) U.S. Cl.
CPC ............... *H04N 9/70* (2013.01); *G06K 9/38* (2013.01); *G06K 9/4652* (2013.01); *G06K 9/4661* (2013.01)

(58) Field of Classification Search
CPC .... G06K 2209/01; G06K 9/38; G06K 9/0014; G06K 9/00456; G06K 9/40; G06K 9/4652; G06K 9/6202; G06T 2207/20148; G06T 2207/10024; G06T 2207/20144; H04N 1/4092; H04N 1/40062; H04N 1/58
See application file for complete search history.

(56) References Cited

U.S. PATENT DOCUMENTS

| 6,038,295 | A | 3/2000 | Mattes |
| 6,980,909 | B2 | 12/2005 | Root et al. |
| 7,173,651 | B1 | 2/2007 | Knowles |
| 7,352,490 | B1 * | 4/2008 | Tse ...................... H04N 1/3871 358/1.9 |
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |

(Continued)

FOREIGN PATENT DOCUMENTS

| CA | 2887596 A1 | 7/2015 | |
| WO | WO 2008028893 A1 * | 3/2008 | ........... A61B 5/0059 |

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

*Primary Examiner* — Li Liu
(74) *Attorney, Agent, or Firm* — Schwegman Lundberg & Woessner, P.A.

(57) ABSTRACT

Systems, devices, media, and methods are presented for receiving a set of images in a video stream, converting one or more images of the set of images to a set of single channel images, generating a set of approximation images from the set of single channel images, and generating a set of binarized images by thresholding the set of approximation images.

20 Claims, 10 Drawing Sheets

(56) References Cited

U.S. PATENT DOCUMENTS

| | | | |
|---|---|---|---|
| 9,443,227 B2 | 9/2016 | Evans et al. | |
| 9,489,661 B2 | 11/2016 | Evans et al. | |
| 9,491,134 B2 | 11/2016 | Rosen et al. | |
| 2001/0028737 A1* | 10/2001 | Takakura | G06T 7/0081 382/162 |
| 2002/0028027 A1* | 3/2002 | Koyama | G06F 17/145 382/289 |
| 2004/0240737 A1* | 12/2004 | Lim | G06K 9/325 382/182 |
| 2007/0273878 A1* | 11/2007 | Fujii | G01N 15/1459 356/337 |
| 2008/0068660 A1* | 3/2008 | Loce | H04N 1/40075 358/3.06 |
| 2011/0096170 A1* | 4/2011 | Villanueva | H04N 17/004 348/187 |
| 2011/0202598 A1 | 8/2011 | Evans et al. | |
| 2012/0209924 A1 | 8/2012 | Evans et al. | |
| 2013/0259363 A1* | 10/2013 | Ozawa | G06K 9/4652 382/164 |
| 2013/0301898 A1* | 11/2013 | Jain | G06T 7/0012 382/133 |
| 2016/0086031 A1* | 3/2016 | Shigeno | G06K 9/00 382/103 |

\* cited by examiner

BINARIZATION OF A VIDEO STREAM

TECHNICAL FIELD

Embodiments of the present disclosure relate generally to automated image processing of a video stream. More particularly, but not by way of limitation, the present disclosure addresses systems and methods for generating binary images from a set of images forming a video stream.

BACKGROUND

Telecommunications applications and devices can provide communication between multiple users using a variety of media, such as text, images, sound recordings, and/or video recording. For example, video conferencing allows two or more individuals to communicate with each other using a combination of software applications, telecommunications devices, and a telecommunications network. Telecommunications devices may also record video streams to transmit as messages across a telecommunications network.

Binarization is the process of generating a binary image from an image. Binarization methods are often developed in order to interpret and binarize single images having specified content. Some binarization methods employ machine learning and predetermined databases to interpret and binarize image content, such as text. These methods learn and predict characteristics using models built using machine learning methods prior to binarizing an image.

BRIEF DESCRIPTION OF THE DRAWINGS

Various ones of the appended drawings merely illustrate example embodiments of the present disclosure and should not be considered as limiting its scope.

Figure 1:
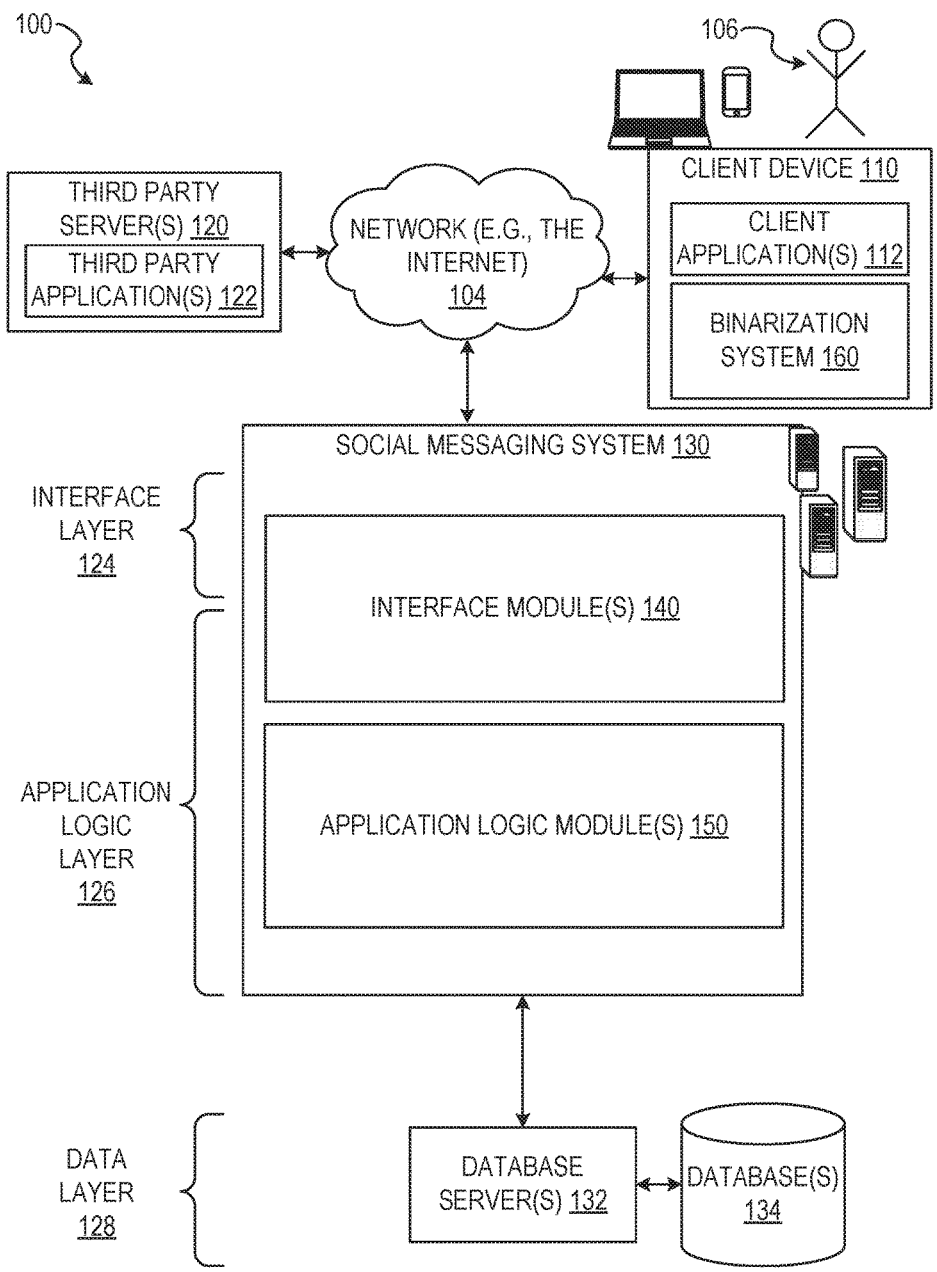
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Although techniques exist to binarize individual images, issues may result from using still image binarization techniques to attempt to binarize a set of images within a video stream. Challenges are present when binarizing the set of images of the video stream in real time while capturing the video stream. Still image binarization techniques are often too processor intensive to be performed in real time on a video stream without adversely affecting the video stream. Processing intensive binarization methods preclude binarizing the set of images in addition to performing other image processing operations without adverse effect to the video stream.

Still image binarization techniques perform poorly with respect to uneven or poor lighting conditions. Binarization techniques which may be used within a video stream are often limited to interpreting and binarizing images having predefined content, and may poorly binarize images of a video stream where lighting conditions, light sources, light quality, or direction of light change from image to image of the video stream. Accordingly, there is still a need in the art to improve binarization techniques for binarizing a set of images within a video stream. Where a binarization technique is built on a model for a predefined content type, that binarization often has difficulty in binarizing images with content which differs from the content type on which the model was trained.

A binarization system is described that binarizes images or portions of images forming a video stream. In one embodiment, an application operating on a device performs image processing and modification tasks. Among the image processing and modification tasks, the application generates binary images from a set of images forming a video stream. Binary images are digital images in which pixels within the image have only one of two possible values. Once initiated, the application receives an image capture mode selection relating to an image processing task to modify an aspect of a video stream. A binarization system within the application converts frames (e.g., images) within the video stream to a single channel image (e.g., red channel, blue channel, green channel, grayscale), generates an approximation image from the single channel image, and generates a binarized image by thresholding the approximation image. In some instances, based on the binarized video stream (e.g., one or more binary images), the application performs an image processing task associated with the image capture mode. For example, the binarized video stream may act as an input stream for the application to perform color or size changes, generating and applying overlays, and other image processing tasks on a video stream captured and presented in real time.

In some embodiments, the methods and systems described herein may be used as a stage of object detection algorithms within a video stream. For example, binarization methods may be used in face feature detection algorithms. In some embodiments, the binarization methods may prepare an image for modification within the video stream, detect objects of interest within an image, or detect a facial feature (e.g., an iris of an eye, an eyebrow, or teeth). The binarization methods enable detection of small and distinguished regions within an image of a video stream having poor or non-uniform lighting conditions. The binarization methods produce binary images cleared of noise within a video stream within real time as the video stream is being captured.

In some embodiments, binarization methods described herein may be used in mobile applications to apply effects on a video with a human face in real-time. The application receives or captures a video stream in the form of images. The application passes a frame of the video to a binarization system, described below, which binarizes the images of the video stream. The binarization system may then pass the binarized images to another portion of the application. After binarization, the application may generate an object region (e.g., a face feature region) based on the binarization. The object region may then be passed to an effects portion of the application which applies one or more effect to the object region or another image of the video stream based on the object region. For example, the effects portion may change a color of teeth depicted within a video stream, an iris color of one or more iris depicted within the video stream, a shape of an object depicted within the video stream, or any other suitable effect.

The above is one specific example. The various embodiments of the present disclosure relate to devices and instructions by one or more processors of a device to binarize a video stream to be further processed and transmitted by the device to another device while the video stream is being captured (e.g., modifying a video stream in real time). A binarization system is described that generates a set of binary images of a video stream with a set of operations which identifies and tracks objects of interest across a video stream and through a set of images comprising the video stream. In various example embodiments, the binarization system generates the binary images at or near O(1) time complexity. Although described with respect to facial features, it should be understood that the binarization system may binarize images to identify and define any object of interest, as discussed below.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions, forming a hardware-implemented module or engine and acting, at the time of the execution of instructions, as a special purpose machine configured to carry out a particular set of functions. To avoid obscuring the inventive subject matter, various functional modules and engines that are not germane to conveying an understanding of the inventive subject matter have been omitted from FIG. 1. Of course, additional functional modules and engines may be used with a social messaging system 130, such as that illustrated in FIG. 1, to facilitate additional functionality that is not specifically described herein. Furthermore, the various functional modules and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface modules (e.g., a web server) 140, which receive requests from various client-computing devices and servers, such as client devices 110 executing client application(s) 112, and third party servers 120 executing third party application(s) 122. In response to received requests, the interface module 140 communicates appropriate responses to requesting devices via a network 104. For example, the interface modules 140 can receive requests such as Hypertext Transfer Protocol (HTTP) requests, or other web-based, application programming interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of a binarization system 160 such that modules of the binarization system 160 configure the client device 110 to perform a specific set of functions with respect to operations of the binarization system 160.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the binarization system 160 to binarize images of video streams during capture of the video streams and transmit the video streams (e.g., with image data modified based on the binarized images of the video stream). In some embodiments, the binarization system 160 performs additional operations to modify one or more images within the video stream for transmission and presentation at another client device 110.

Each of the client devices 110 can comprise a computing device that includes at least a display and communication capabilities with the network 104 to access the social messaging system 130, other client devices 110, and third party servers 120. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130. For instance, a social messaging application can be implemented with the application logic modules 150. The social messaging application provides a messaging mechanism for users 106 of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic modules 150.

As illustrated in FIG. 1, the social messaging system 130 may include at least a portion of the binarization system 160 capable of identifying, tracking, and modifying video data during capture of the video data by the client device 110. Similarly, the client device 110 includes a portion of the binarization system 160, as described above. In other examples, client device 110 may include the entirety of binarization system 160. In instances where the client device 110 includes a portion of(or all of) the binarization system 160, the client device 110 can work alone or in cooperation with the social messaging system 130 to provide the functionality of the binarization system 160 described herein.

In some embodiments, the social messaging system 130 may be an ephemeral message system that enables ephemeral communications where content (e.g. video clips or images) are deleted following a deletion trigger event such as a viewing time or viewing completion. In such embodiments, a device uses the various modules described herein within the context of any of generating, sending, receiving, or displaying aspects of an ephemeral message. For example, a device implementing the binarization system 160 may identify, track, and modify an object of interest, such as a set of exposed teeth within a mouth depicted in the video clip. The device may modify the object of interest during capture of the video clip without image processing after capture of the video clip as a part of a generation of content for an ephemeral message.

Figure 2:
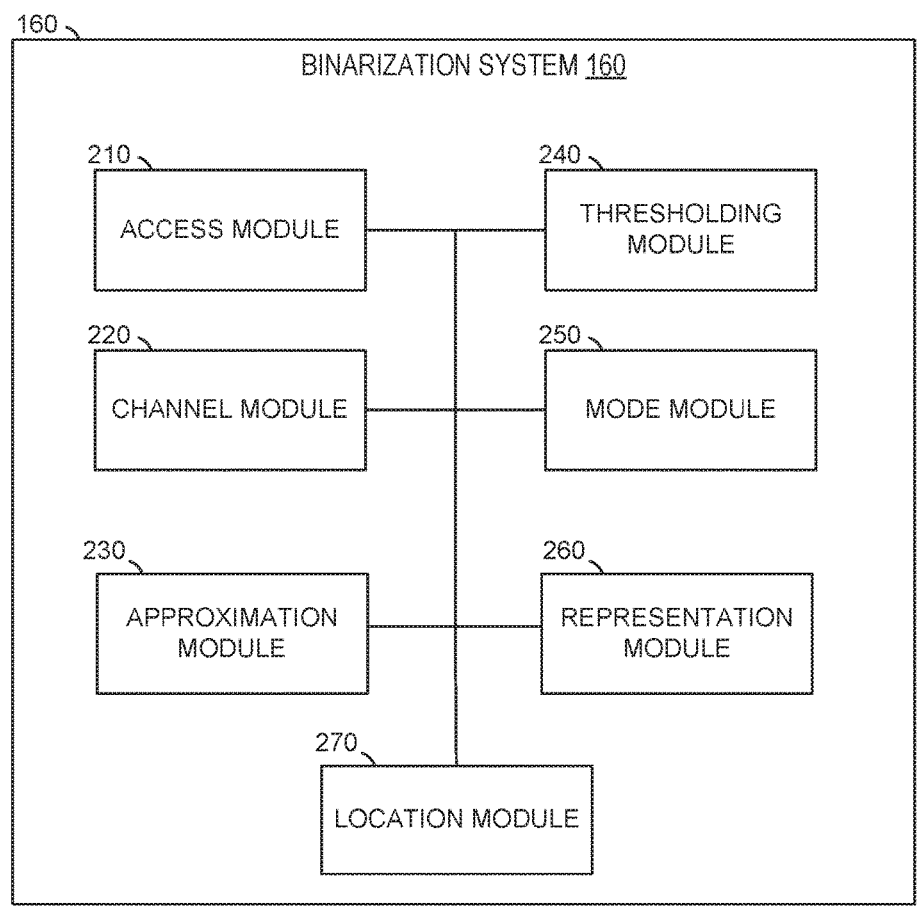
FIG. 2 is a diagram illustrating a binarization system, according to some example embodiments.

In FIG. 2, in various embodiments, the binarization system 160 can be implemented as a standalone system or implemented in conjunction with the client device 110, and is not necessarily included in the social messaging system 130. The binarization system 160 is shown to include an access module 210, a channel module 220, an approximation module 230, a thresholding module 240, a mode module 250, a representation module 260, and a location module 270. All, or some, of the modules 210-250, communicate with each other, for example, via a network coupling, shared memory, and the like. Each module of modules 210-250 can be implemented as a single module, combined into other modules, or further subdivided into multiple modules. Other modules not pertinent to example embodiments can also be included, but are not shown.

The access module 210 receives or accesses a set of images (e.g., frames) in a video stream. In some embodiments, the access module 210 receives the set of images directly from an image capture device of the client device 110. In some instances, an application or module of the client device 110 passes the set of images to the access module 210 for use in one or more of the methods described herein.

The channel module 220 converts one or more images of the set of images to a set of single channel images. In some embodiments, the channel module 220 determines a channel to which the set of images are to be converted in cooperation with the mode module 250. The channel module 220 may also independently identify a desired or selected single channel for conversion of the set of images of the video stream. In some embodiments, the channel module 220 converts the set of images by discarding or otherwise isolating the pixel values for a single channel (e.g., red, blue, green, or intensity) from other pixel values for the set of images.

The approximation module 230 generates a set of approximation images from the set of single channel images of the video stream. In some embodiments, the approximation module 230 generates the approximation images by generating one or more blurred images using a blur operation. The blurred images are then converted into the set of approximation images based on a combination of blur intensity values for the pixels of the blurred images and original intensity values for the pixels as received by the access module 210.

The thresholding module 240 generates a set of binarized images of a video stream based on the set of approximation images. The thresholding module 240 generates the binarized image by performing one or more thresholding operations on the set of approximation images and converting pixel values of the approximation images to binary values. In some embodiments, the thresholding module 240 uses a predetermined threshold value or selects from a set of threshold values to compare and convert approximation image pixel values to binarized values.

The mode module 250 identifies an image capture mode to which the client device 110 is set. In some embodiments, the mode module 250 identifies the image capture mode by receiving selection or after an image modification application receives selection of an image capture mode icon. In some instances, the mode module 250 identifies a single channel associated with the image capture mode.

The representation module 260 performs one or more operations to generate representational images within the video stream. In some embodiments, the representation module 260 generates integral representations of processed frames within a video stream, such as single channel images. The representation module 260 identifies original intensity values for pixels within the set of images of the video stream. In some embodiments, the representation module 260 selects a pixel radius for generating a blur image or an initial approximation image. The representation module 260 may also generate blur intensity values for a set of single channel images.

The location module 270 performs locating operations within the binarization system 160. In various example embodiments, the location module 270 identifies and provides locations for an object of interest depicted by images of a video stream (e.g., one or more frames of a video stream). In some embodiments, the location module 270 may be a portion of a face tracking module or system. In some instances, where an object of interest is a portion of a face, the location module 270 identifies a location of a face depicted in one or more images of within a video stream and one or more facial features depicted on the face.

The location module 270 may locate an area of interest within the one or more images of the video stream containing the object of interest. For example, the area of interest identified by the location module 270 may be a portion of images within the video stream, such as a rectangle in which the object of interest appears. Although referenced as a rectangle, the area of interest may be any suitable shape or combination of shapes, as described below. For example, the area of interest may be represented as a circular shape, a polygonal shape, or an outline shaped and sized similarly to and including the object of interest (e.g., an outline of a mouth, a wall, a vehicle).

In some embodiments, the location module 270 performs cropping functions. For example, after determining an area of interest within an image, the location module 270 crops the image, removing from consideration areas outside of the area of interest. In some instances, after cropping, the area of interest is processed by one or more other modules of the binarization system 160.

In some embodiments, portions of the binarization system 160 interact with portions of a video modification application presenting a user interface. The video modification application presents a set of user interface elements on the client device 110. Each of the user interface elements of the set of user interface elements is a representation of an image capture mode. For example, a first image capture mode may change eye color in a video stream, a second image capture mode may whiten teeth within a video stream, a third image capture mode may change color of an object within a video stream, and a fourth image capture mode may change dimensions of an object, or a one of a set of aspects of the object, within a video stream. After initiating the image modification application, the client device 110 initially presents a user interface including the set of user interface elements (e.g., image capture mode icons) overlaid on a depiction of a video stream of objects perceivable by an image capture device associated with or part of the client device 110.

Figure 3:
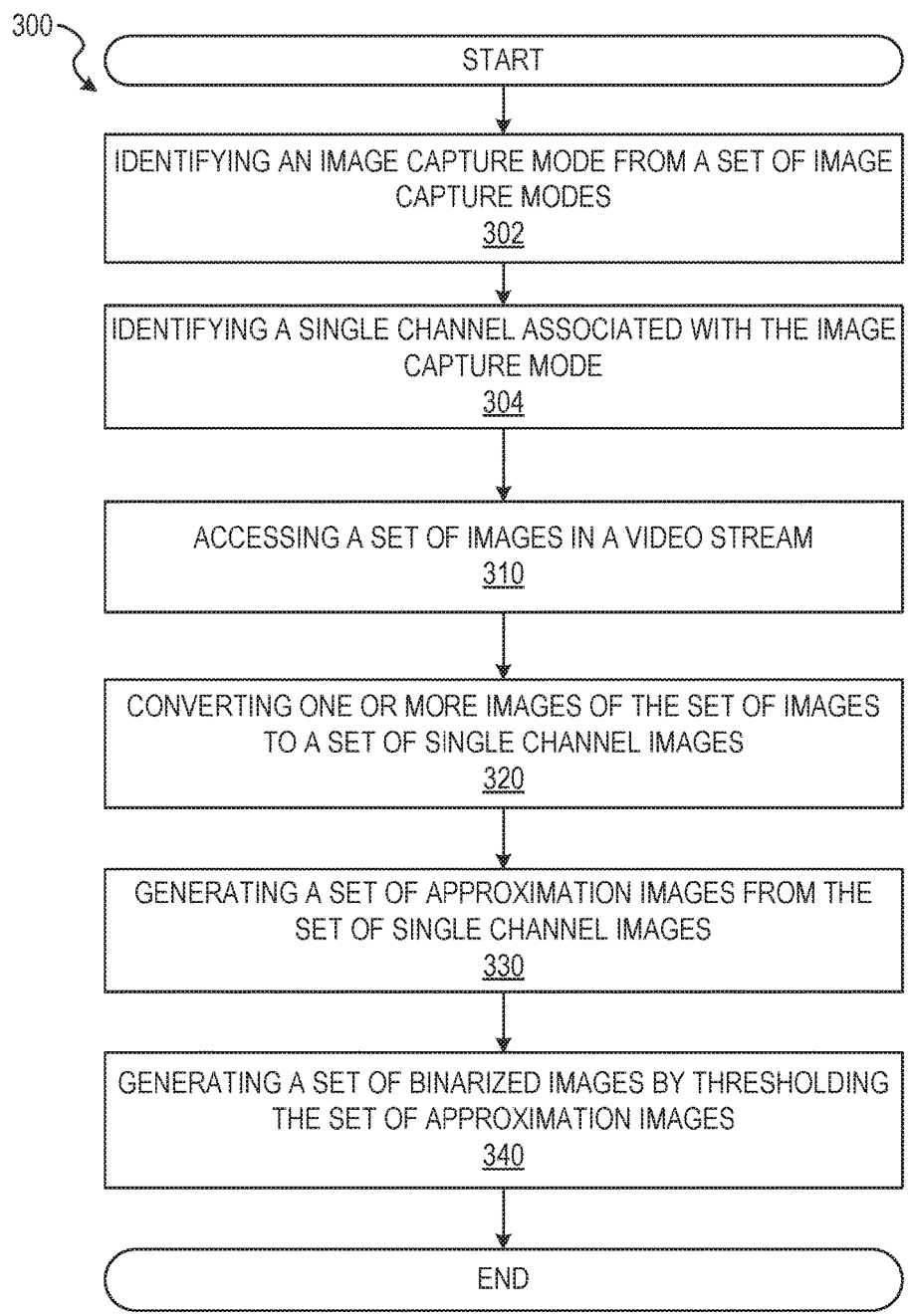
FIG. 3 is a flow diagram illustrating an example method for binarizing images within a video stream, according to some example embodiments.

FIG. 3 depicts a flow diagram illustrating an example method 300 for binarizing portions of a video stream. The operations of method 300 may be performed by components of the binarization system 160, and are so described below for purposes of illustration.

In some embodiments, in operation 302, the mode module 250 identifies an image capture mode from a set of image capture modes. Each image capture mode of the set of image capture modes is associated with an image processing task. In some embodiments, the mode module 250 identifies the image capture mode from the set of image capture modes after the image modification application receives a selection of an image capture mode icon within the user interface presented at the client device 110. In some instances, the image capture application, in response to receiving the image capture mode icon selection, passes the selection to the mode module 250. The mode module 250 may query the image modification application for a current selected image capture mode. In some embodiments, the mode module 250 of the binarization system 160 may form a portion of the image modification application and identify the image capture mode through the selection of the image capture mode icon.

In operation 304, the mode module 250 identifies a single channel associated with the image capture mode. In some embodiments, the single channel is predetermined based on the image processing task associated with the image capture mode. The single channel is selected from a set of single channels which form a part of the image. The set of single channels may comprise a red channel, a blue channel, a green channel, and a grayscale. In some embodiments, the set of single channels comprises cyan, magenta, and black channels. Although described with specified sets of single channels, it should be understood that the set of single channels may comprise any set of color, intensity, or other image values which may be applied to one or more pixels in addition to other values to create color values portrayed in an image.

In operation 310, the access module 210 receives or otherwise accesses a set of images in a video stream. In some instances, the access module 210 accesses the video stream captured by the image capture device associated with the client device 110 and presented on the user interface of the image modification application. The access module 210 may include the image capture device as a portion of hardware comprising the access module 210. In these embodiments, the access module 210 directly receives the video stream captured by the image capture device. In some instances, the access module 210 passes all or part of the video stream (e.g., the set of images comprising the video stream) to one or more modules of the binarization system 160, as described below in more detail.

Figure 4:
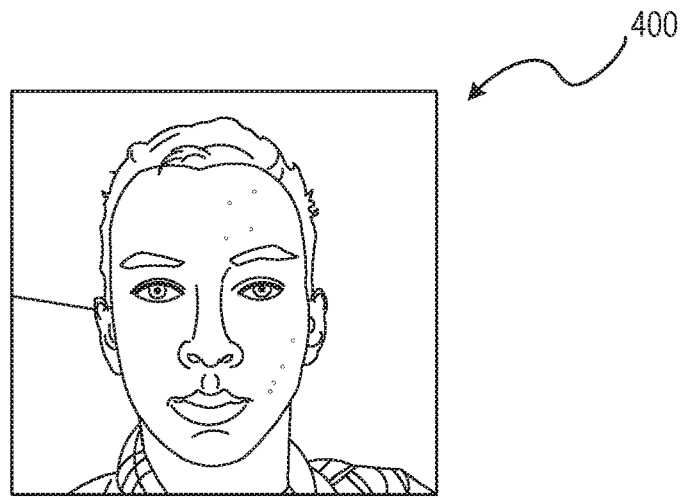
FIG. 4 illustrates an area of interest within one or more images of a video stream, according to some example embodiments.

In some embodiments, the operation 310 comprises one or more sub-operations. After the access module 210 receives the set of images in the video stream, the location module 270 determines an area of interest within one or more images of the set of images of the video stream. For example, as shown in FIG. 4, an area of interest 400 is identified surrounding an object of interest, a face. In response to identifying the area of interest, the location module 270 crops the one or more images of the video stream to discard the portions of the image outside of the area of interest. Where the location module 270 determines an area of interest, the method 300 may be performed on the area of interest.

In some instances, the area of interest is determined based on the image capture mode. In these embodiments, the area of interest is related to a predetermined type of object of interest based on an image processing task to be performed on the video stream. The location module 270 may first identify an object of interest within the set of images and determine the area of interest. The object of interest identified within the set of images may be an example of a type of object of interest. For example, the object of interest may be an eye or an iris, where the type of object of interest is an eye.

The area of interest may also be determined based on the location of the object of interest and a predetermined size, proportion, or expansion based on the object of interest. For example, the size or proportion of the area of interest may be predetermined based on a type of object of interest associated with a particular image processing task. The area of interest may also be based on an expansion of the identified object of interest. For example, where the object of interest is a mouth or an eye, the location module 270 determines the object of interest, bounds for the object of interest, and then determines the area of interest based on adding a predetermined radius of pixels to the bounds of the object of interest. By way of further example, the area of interest may be determined as a bounded box (e.g., rectangle, square, or other shape) surrounding the object of interest. In these instances, the location module 270 determines the bounds of the object of interest and determines the size and proportion of the bounded box for the area of interest which includes the bounds of the object of interest.

In operation 320, the channel module 220 converts one or more images of the set of images to a set of single channel images. In some embodiments where an area of interest has been identified, as described above, the channel module 220 converts an area of interest identified within the one or more images to a single channel area of interest. Where no single channel has been previously identified, the channel module 220 determines the single channel to which the set of images are to be converted, prior to conversion of the one or more images. In some embodiments, the channel module 220 may determine the single channel based on a predetermined association of a single channel with an object or color value within the set of images. For example, the channel module 220 may receive an identified object of interest from the location module 270. The channel module 220 identifies a single channel associated with the type of object of interest identified by the location module 270, and selects the identified single channel. The channel module 220 may convert the one or more images by isolating pixel values (e.g., one or more color values for a pixel) associated with the single channel. In some instances, the channel module 220 converts the one or more images to the set of single channel images by discarding information associated with the other channels of the set of single channels.

In embodiments where the mode module 250 identifies the single channel associated with an image capture mode, as discussed above in the operation 304, the channel module 220, in response to identifying the single channel and receiving the set of images of the video stream, isolates one or more values for a set of pixels within the image. The one or more values are associated with the selected single channel.

In operation 330, the approximation module 230 generates a set of approximation images from the set of single channel images. As will be explained in more detail below with respect to the methods 700 and 800, the operation 330 of generating the set of approximation images may comprise a set of sub-operations. In generating the set of approximation images, the approximation module 230 generates a blurred image for each single channel image of the set of single channel images. The blurred images are then converted into the approximation images. In generating the set of approximation images, the approximation module 230 generates a blur intensity value for each pixel of images within the set of single channel images. In response to generating the blur values, the approximation module 230 replaces a color or intensity value for the pixels of the single channel images with the blur intensity value generated for the pixels.

After generating the set of blur images, the approximation module 230 generates the set of approximation images based on an original intensity value for each pixel and the blur intensity value for each pixel. In some embodiments, the approximation module 230 divides the original intensity value for a pixel by the blur intensity value for that pixel to generate an approximation value for the pixel. The approximation module 230 then replaces the blur intensity value for the pixel with the approximation value. To generate the set of approximation images, the approximation module 230 generates an approximation value for each pixel within the set of blur images and sets the value of each pixel as its approximation value.

Figure 5:
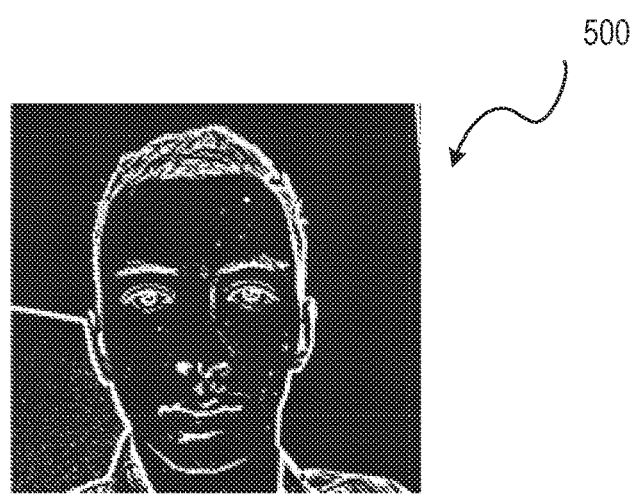
FIG. 5 illustrates a binarized image of an area of interest, according to some example embodiments.

In operation 340, the thresholding module 240 generates a set of binarized images by thresholding the set of approximation images. As shown in FIG. 5, where an area of interest has been identified for an image, the thresholding module 240 generates a binarized area of interest 500. As shown in FIG. 5, the binarized area of interest 500 may be a binary version of the area of interest 400 depicted in FIG. 4.

In some embodiments, the thresholding module 240 compares approximation values for the pixels of the set of approximation images to a predetermined threshold value to generate the set of binarized images. In some embodiments, the predetermined threshold value is 0.922. Where the approximation value for a pixel exceeds the predetermined threshold value, the thresholding module 240 sets the value of the pixel to one (e.g., a white pixel). Where the predetermined threshold value exceeds the approximation value for a pixel, the thresholding module 240 sets the value of the pixel to zero (e.g., a black pixel). In these embodiments, where the threshold value is 0.922, the set of binarized images include pixels having a white value which had a luminance value of ninety-two percent of an averaged level.

In some embodiments, the operation 340 comprises a set of sub-operations. The thresholding module 240 determines a thresholding value. In some instances, the thresholding module 240 determines the thresholding value by identifying a predetermined thresholding value for the binarization system 160. The threshold value may be associated with an image capture mode, a video processing task, or an image characteristic. Where the threshold value is associated with an image characteristic (e.g., a brightness of the image or a white balance level), one or more of the modules of the binarization system 160 determines an average value for the image characteristic and generates the threshold value based on the average value for the image. In some embodiments, the thresholding module 240 determines the threshold value as a fraction of an average pixel intensity of one or more images of the set of images of the video stream, one or more of the single channel images, or one or more of the approximation images. After determining the thresholding value, the thresholding module 240 compares an approximation value with the thresholding value, as described above with respect to the operation 340.

As described above, in response to comparing the threshold value and the approximation value, the thresholding module 240 modifies the approximation value for the one or more pixels to a first binary pixel value or a second binary pixel value. The modification is based on comparing the approximation value and the threshold intensity value. Where the approximation value exceeds the thresholding value, the thresholding module 240 modifies the pixel value to the first binary pixel value. Where the thresholding value exceeds the approximation value, the thresholding module 240 modifies the pixel value to the second binary pixel value. For example, where the approximation value exceeds the thresholding value, the thresholding module 240 modifies the pixel value to one, indicating a white pixel. Where the thresholding value exceeds the approximation value for a pixel, the thresholding module 240 modifies the value for that pixel to zero, indicating a black pixel. Although described using values of zero and one for black and white pixels, it will be understood that the thresholding module 240 may use any two colors or values to generate the set of binarized images.

Figure 6:
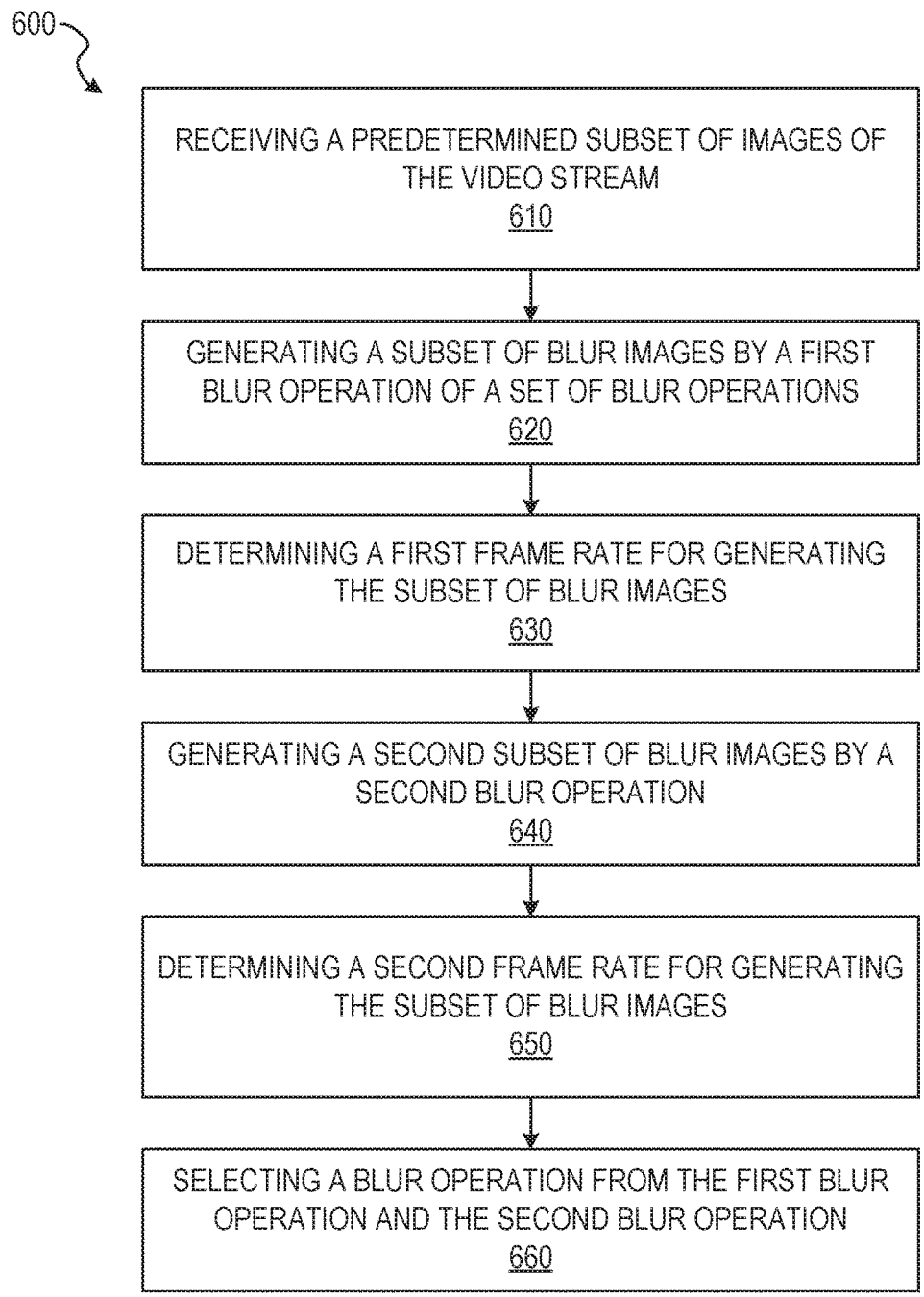
FIG. 6 is a flow diagram illustrating an example method for selecting a blur operation for use in binarizing images within a video stream, according to some example embodiments.

FIG. 6 shows a flow diagram illustrating an example method 600 for selecting a blur operation from a set of blur operations. In some embodiments, operations of the method 600 are performed prior to or as sub-operations of one or more operations of the method 300.

In operation 610, the approximation module 230 receives a predetermined subset of images of the video stream from the access module 210. In some instances, the predetermined subset of images is a number of images between one and five. However, the approximation module 230 may be supplied with any suitable number of images of the set of images of the video stream. In embodiments where the approximation module 230 determines a blur operation regardless of the image capture mode, the approximation module 230 receives the subset of images from the access module 210 when the image modification application is initiated, prior to selection of the image capture mode icon.

In embodiments where the approximation module 230 determines the blur operation based in part on the image capture mode, the approximation module 230 receives the subset of images from the access module 210 in response to selection of the image capture mode icon. In some instances, the approximation module 230 receives the subset of images from the access module 210 in response to initiation of an image capture mode, based on selection of an image capture icon after selection of the image capture mode icon. For example, the client device 110 presents a first interface including the set of image capture mode icons. After receiving a selection of an image capture mode icon, the image modification application presents a second user interface depicting a video stream perceivable by the image capture device of the client device 110 and a user interface element (e.g., an image capture icon) configured to cause the image modification application to initiate modification of a video stream captured by the image capture device and cause the approximation module 230 to determine the blur operation using a first or initial subset of images of the video stream.

In response to receiving the subset of images, in operation 620, the approximation module 230 generates a subset of blur images by a first blur operation of the set of blur operations. Blur operations of the set of blur operations will be discussed below with respect to the methods 700 and 800. Although the present disclosure details two blur operations, it will be understood that the set of blur operations may include any suitable blur operation capable of producing a set of blur images capable of being converted into the set of approximation images.

In some embodiments, the approximation module 230 determines a blur operation from a set of blur operations, to generate the set of blur images. In some instances, the determination of the blur operation is performed using a set of sub-operations. The set of sub-operations may be performed during or prior to the performance of the method 300. Once the image modification application is initialized, in some embodiments, the approximation module 230 performs one or more sub-operations to select the blur operation, as will be described in more detail below.

In operation 630, the approximation module 230 determines a first frame rate for generating the subset of blur images using the first blur operation. The frame rate may be determined by calculating a time taken to process one or more of the subset of blur images, identifying an average processor load during processing for a graphics processor of the client device 110, and determining an average number of blur images which can be generated by the approximation module 230, based on the average processor load, in a predetermined period of time.

In operation 640, the approximation module 230 generates a second subset of blur images by a second blur operation of the set of blur operations. The subset of blur images may be generated as described in the methods 700 or 800 or any other suitable method.

In operation 650, the approximation module 230 determines a second frame rate for generating the subset of blur images using the second blur operation. The second frame rate may be determined similarly or the same as the first frame rate described in the operation 630.

In operation 660, the approximation module 230 selects a selected blur operation from the first blur operation and the second blur operation. The approximation module 230 compares the first frame rate with the second frame rate and a frame rate threshold. Where both the first frame rate and the second frame rate exceed the threshold value, the approximation module 230 selects the fastest frame rate between the first frame rate and the second frame rate. For example, where both the first and second frame rates exceed the threshold frame rate, and the second frame rate exceeds the first frame rate, the approximation module 230 may select the second blur operation. Although described with reference to a first blur operation and a second blur operation, it will be understood that the approximation module 230 may generate a plurality of subsets of blur images by a plurality of blur operations and determine a frame rate for each blur operation of the plurality of blur operations. The approximation module 230 may then select a blur operation from the plurality of blur operations. In these instances, the plurality of blur operations may be any number of blur operations suitable for the binarization methods described herein. For example, the plurality of blur operations may include two blur operations, as described, or more than two blur operations.

In some embodiments, the approximation module 230 prioritizes one or more of the blur operations of the set of blur operations. For example, where the first blur operation is prioritized over the second blur operation, where both the first and second frame rates exceed the threshold frame rate, the approximation module 230 selects the first blur operation regardless of whether the second blur operation provides a higher frame rate. A blur operation may be prioritized based on providing a more reliable blur image than one or more other blur operations of the set of blur operations, where a binary image resulting from using the blur operation presents fewer noise artifacts (e.g., white pixels improperly positioned within a set of black pixels) or a higher level of detail than other blur operations, or based on an image size for the set of images in the video stream.

Although described in some embodiments above as being selected based on the initial processing of a set of images, the approximation module 230 may select the blur operation using other methods. In some embodiments, prior to generating the set of approximation images, the approximation module 230 identifies a blur operation to be used in generating the blurred images. In some embodiments, the approximation module 230 selects the blur operation based on resources associated with the client device 110. In these embodiments, the approximation module 230 may access set of system characteristics to determine a hardware configuration of the client device 110. The approximation module 230 may determine the graphics processing capabilities of the client device 110. After determining the hardware configuration, the approximation module 230 determines a processing load for a graphics processor of the client device 110. Based on the hardware configuration and the processing load, the approximation module 230 may determine the blur operation to be used. For example, where the graphics processing capabilities (e.g., a processing speed of the graphics processor) is above a predetermined processing threshold and the processor load is below a predetermined load threshold, the approximation module 230 selects a first blur operation. Where either the graphics processing capabilities are below the predetermined processing threshold or the processing load is above the predetermined load threshold, the approximation module 230 selects a second blur operation.

In some instances, in addition to the hardware configuration and the processor load, the approximation module 230 performs the blur operation selection after the access module 210 begins receiving the set of images of the video stream. In these embodiments, the approximation module 230 determines one or more images characteristic of the set of images received by the access module 210 and the image capture mode. Where the method 300 is to be applied to the entirety of the image of the set of images (e.g., no determination of an area of interest is to take place), the approximation module 230 determines an image size (e.g., one or more pixel values indicating dimensions of the images) for the set of images. Where the method 300 is to be applied to an area of interest within the set of images, the approximation module 230 determines an area of interest size (e.g., one or more pixel values indicated dimensions of the area of interest) for the area of interest. The approximation module 230 then determines the blur operation based on the hardware configuration, the processor load, and size information (e.g., image size or area of interest size) of the video stream. For example, where the graphics processing capabilities exceed the processing threshold, the processing load is below the load threshold, and the size information is below a size threshold, the approximation module 230 selects the first blur operation.

In some instances, the approximation module 230 prioritizes one blur operation of a set of blur operations over other blur operations of the set, based on one or more of the graphics processor capabilities, the processor load, the size information, and the image capture mode. In these embodiments, based on one or more of the image capture mode and an object of interest within the set of images, the approximation module 230 identifies a first blur operation. In some embodiments, a first blur operation may be associated with each image capture mode of the set of image capture modes or to an object of interest. In these embodiments, the approximation module 230 determines, based on the hardware configuration and the processor load, whether generating the set of approximation images from the set of single channel images using the first blur operation negatively impacts presentation of the video stream in real time. Where the video stream is negatively impacted, the approximation module 230 selects a second blur operation. Negative impacts which may prevent real time presentation of the video stream may include jitter, frame loss, or decreased frame rate based on processing time using the first blur operation.

Figure 7:
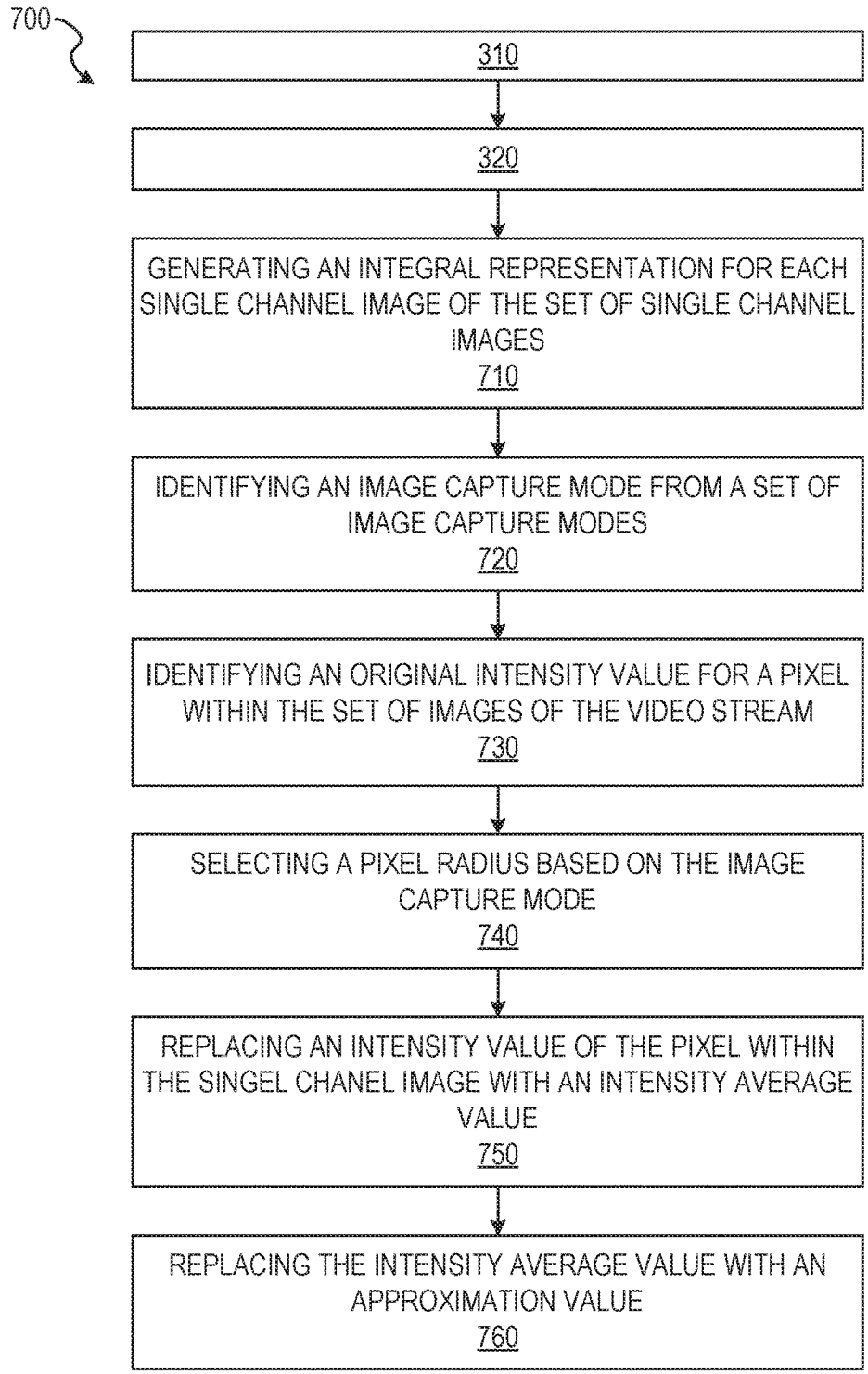
FIG. 7 is a flow diagram illustrating an example method for generating an approximation image for use in binarizing images within a video stream, according to some example embodiments.

FIG. 7 shows a flow diagram illustrating an example method 700 for binarizing portions of a video stream. The operations of method 700 may be performed by components of the binarization system 160. In some instances, certain operations of the method 700 may be performed using one or more operations of the method 300 or as sub-operations of one or more operations of the method 300, as will be explained in more detail below.

In some embodiments, the method 700 is initiated by one or more operations of the method 300. As shown in FIG. 7, in some embodiments, the method 700 is initially performed by performing the operations 310 and 320.

In operation 710, the representation module 260 generates an integral representation for each single channel image of the set of single channel images. The representation module 260 generates the integral representation by generating a summed area table for at least a portion of each single channel image of the set of single channel images. The summed area table may be a sum of values in a rectangular grid such as an image of the set of images or an area of interest.

In operation 720, the mode module 250 identifies an image capture mode from a set of image capture modes. The operation 720 may be performed similarly to or the same as the operation 304, described above.

In operation 730, the representation module 260 identifies an original intensity value for a pixel within the set of images of the video stream. In some embodiments, the representation module 260 may identify the original intensity value of the pixel based on a cached version of the set of images. In some instances, while generating the integral representation, the representation module 260 identifies and stores the original intensity value of each pixel within an image being processed and identifies the original intensity value for the pixel based on the stored original intensity value.

In operation 740, the representation module 260 selects a pixel radius based on the image capture mode. Selecting the pixel radius comprises one or more sub-operations. In some embodiments, the mode module 250 identifies an image capture mode from a set of image capture modes. Each image capture mode may be associated with an image processing task. In some instances, image capture modes are associated with predetermined pixel radii. Image processing tasks for editing or modifying finer details may be associated with a smaller pixel radius, while image processing tasks for editing and modifying larger details may be associated with a larger pixel radius. For example, where an image processing task is associated with changing a color of an iris of an eye, may be associated with a pixel radius of between one and ten pixels. In some embodiments, the image processing task may be limited to an area of interest of an image along with a smaller pixel radius to enable binarization of smaller areas of an image or finer details. In these embodiments, in response to or based on the identified image capture mode, the representation module 260 selects the pixel radius form a set of pixel radii.

In operation 750, the approximation module 230 generates a set of approximation images by replacing an intensity value of the pixel within the single channel image, in which the pixel occurs, with an intensity average value for a set of pixels proximate to the pixel within the pixel radius. In some embodiments, the approximation module 230 performs the operation 750 to generate the set of approximation images based on the summed area table and the selected pixel radius.

In operation 760, the approximation module 230 replaces the intensity average value for the pixel with an approximation value. The approximation value is generated based on the original intensity value for the pixels within the set of images of the video stream and the intensity average value. In some embodiments, the operation 760 may be performed similarly to or the same as the operation 330. In some embodiments, the approximation value is generated using equation 1:

$$R = \log(I/A_I)$$

In equation 1, "R" is the approximation value of the pixel, "I" is the original intensity value, and "$A_I$" is the intensity average value for the pixel.

Figure 8:
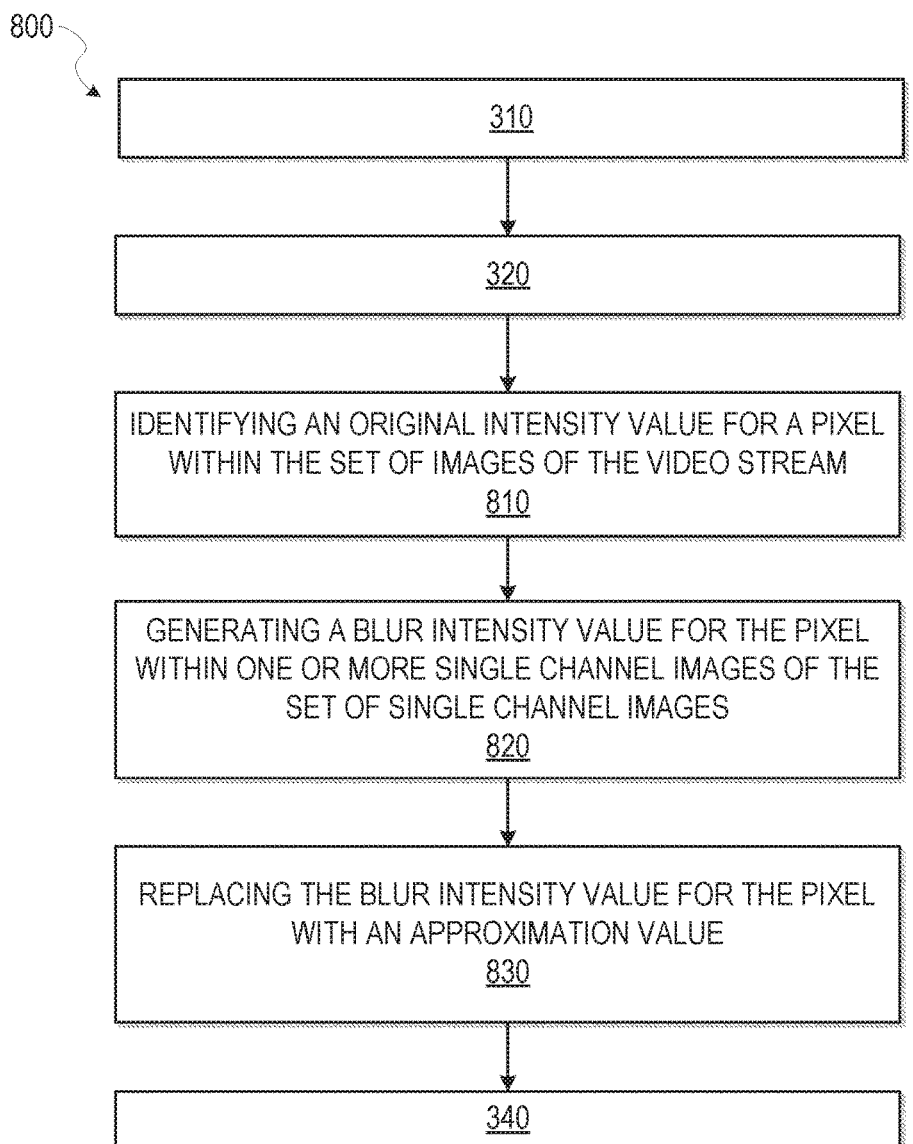
FIG. 8 is a flow diagram illustrating an example method for generating an approximation image for use in binarizing images within a video stream, according to some example embodiments.

FIG. 8 depicts a flow diagram illustrating an example method 800 of binarizing an area of interest in a video stream using the binarization system 160. The operations of method 800 may be performed by components of the binarization system 160. In some instances, certain operations of the method 800 may be performed using one or more operations of the methods 300 or 700, in one or more of the described embodiments, or as sub-operations of one or more operations of the methods 300 or 700, as will be explained in more detail below.

In some embodiments, the method 800 is initiated by one or more operations of the method 300. As shown in FIG. 8, in some embodiments, the method 800 is initially performed by performing the operations 310 and 320.

In operation 810, the representation module 260 identifies an original intensity value for a pixel within the set of images of the video stream. The operation 810 may be performed similarly to or the same as the operation 730.

In operation 820, the representation module 260 generates a blur intensity value for the pixel within one or more single channel images of the set of single channel images. The blur intensity value may be generated using a Gaussian function to produce a Gaussian blur value for the pixel.

In operation 830, the approximation module 230 replaces the blur intensity value for the pixel with an approximation value. The approximation value is generated based on an original intensity value for the pixel and the blur intensity value for the pixel. In some embodiments, the operation 830 may be performed similarly or the same as the operation 330. In some embodiments, the approximation value is generated using equation 2:

$$R = \log(I/G_I)$$

In equation 2, "R" is the approximation value of the pixel, "I" is the original intensity value, and "$G_I$" is the blur intensity value for the pixel.

Modules, Components, and Logic

Certain embodiments are described herein as including logic or a number of components, modules, or mechanisms. Modules can constitute hardware modules. A "hardware module" is a tangible unit capable of performing certain operations and can be configured or arranged in a certain physical manner. In various example embodiments, computer systems (e.g., a standalone computer system, a client computer system, or a server computer system) or hardware modules of a computer system (e.g., at least one hardware processor, a processor, or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by processors that are temporarily configured (e.g., by software) or permanently configured to perform the relevant operations.

Whether temporarily or permanently configured, such processors constitute processor-implemented modules that operate to perform operations or functions described herein. As used herein, "processor-implemented module" refers to a hardware module implemented using processors.

Similarly, the methods described herein can be at least partially processor-implemented, with a particular processor or processors being an example of hardware. For example, at least some of the operations of a method can be performed by processors or processor-implemented modules. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via appropriate interfaces (e.g., an application program interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 9:
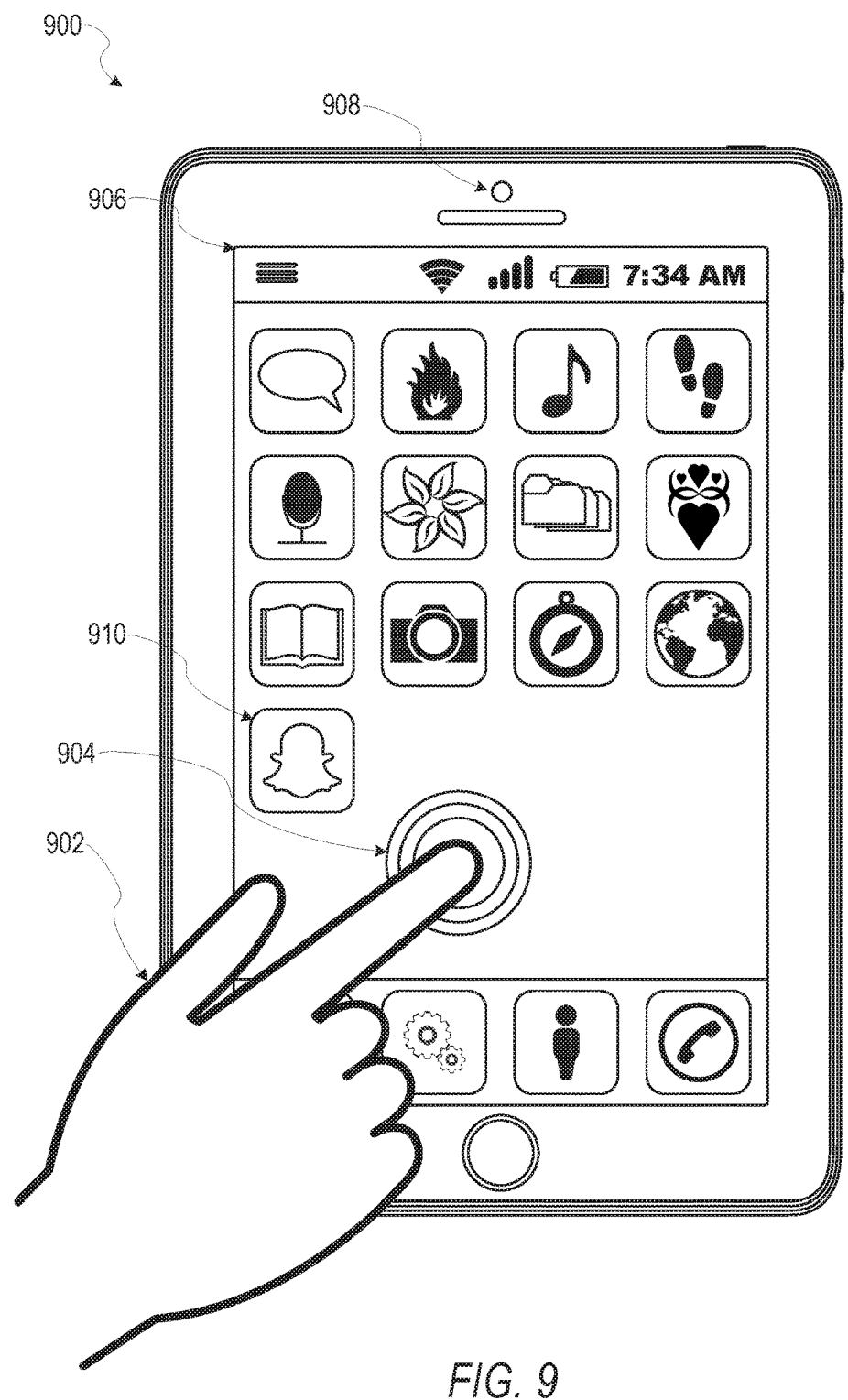
FIG. 9 is a user interface diagram depicting an example mobile device and mobile operating system interface, according to some example embodiments.

FIG. 9 illustrates an example mobile device 900 executing a mobile operating system (e.g., IOS™, ANDROID™, WINDOWS® Phone, or other mobile operating systems), consistent with some embodiments. In one embodiment, the mobile device 900 includes a touch screen operable to receive tactile data from a user 902. For instance, the user 902 may physically touch 904 the mobile device 900, and in response to the touch 904, the mobile device 900 may determine tactile data such as touch location, touch force, or gesture motion. In various example embodiments, the mobile device 900 displays a home screen 906 (e.g., Springboard on IOS™) operable to launch applications or otherwise manage various aspects of the mobile device 900. In some example embodiments, the home screen 906 provides status information such as battery life, connectivity, or other hardware statuses. The user 902 can activate user interface elements by touching an area occupied by a respective user interface element. In this manner, the user 902 interacts with the applications of the mobile device 900. For example, touching the area occupied by a particular icon included in the home screen 906 causes launching of an application corresponding to the particular icon.

The mobile device 900, as shown in FIG. 9, includes an imaging device 908. The imaging device 908 may be a camera or any other device coupled to the mobile device 900 capable of capturing a video stream or one or more successive images. The imaging device 908 may be triggered by the binarization system 160 or a selectable user interface element to initiate capture of a video stream or succession of images and pass the video stream or succession of images to the binarization system 160 for processing according to the one or more methods described in the present disclosure.

Many varieties of applications (also referred to as "apps") can be executing on the mobile device 900, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 900 includes a social messaging app 910 such as SNAPCHAT® that, consistent with some embodiments, allows users 902 to exchange ephemeral messages that include media content. In this example, the social messaging app 910 can incorporate aspects of embodiments described herein. For example, in some embodiments, the social messaging application 910 includes an ephemeral gallery of media created by users 902 of the social messaging application 910. These galleries may consist of videos or pictures posted by a user 902 and made viewable by contacts (e.g., "friends") of the user 902. Alternatively, public galleries may be created by administrators of the social messaging application 910 consisting of media from any users 902 of the application (and accessible by all users 902). In yet another embodiment, the social messaging application 910 may include a "magazine" feature which consists of articles and other content generated by publishers on the social messaging application 910's platform and accessible by any users 902. Any of these environments or platforms may be used to implement concepts of the present disclosure.

In some embodiments, an ephemeral message system may include messages having ephemeral video clips or images which are deleted following a deletion trigger event such as a viewing time or viewing completion. In such embodiments, a device implementing the binarization system 160 may generate a stream of binarized images or binarized areas of interest to identify, track, and modify an object of interest within the ephemeral video clip, as the ephemeral video clip is being captured by the device and transmit the ephemeral video clip to another device using the ephemeral message system.

Software Architecture

Figure 10:
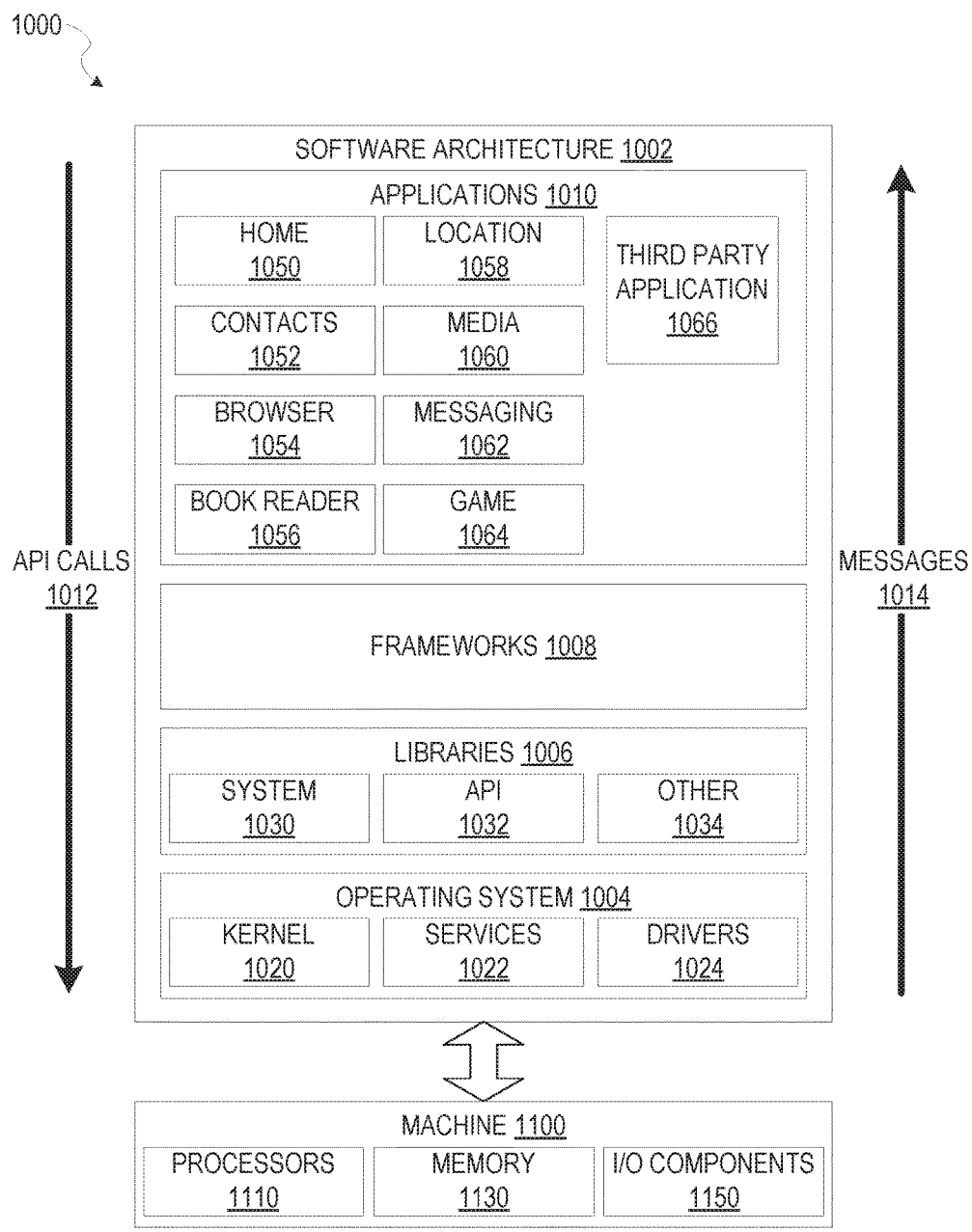
FIG. 10 is a block diagram illustrating an example of a software architecture that may be installed on a machine, according to some example embodiments.

FIG. 10 is a block diagram 1000 illustrating an architecture of software 1002, which can be installed on the devices described above. FIG. 10 is merely a non-limiting example of a software architecture 1002, and it will be appreciated that many other architectures can be implemented to facilitate the functionality described herein. In various embodiments, the software 1002 is implemented by hardware such as machine 1100 of FIG. 11 that includes processors 1110, memory 1130, and I/O components 1150. In this example architecture, the software 1002 can be conceptualized as a stack of layers where each layer may provide a particular functionality. For example, the software 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party application 1066. According to some embodiments, the applications 1010 are programs that execute functions defined in the programs. Various programming languages can be employed to create the applications 1010, structured in a variety of manners, such as object-oriented programming languages (e.g., Objective-C, Java, or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system 1004 such as IOS™, ANDROID™, WINDOWS® PHONE, or another mobile operating systems 1004. In this example, the third party application 1066 can invoke the API calls 1012 provided by the operating system 1004 to facilitate functionality described herein.

Example Machine Architecture and Machine-Readable Medium

Figure 11:
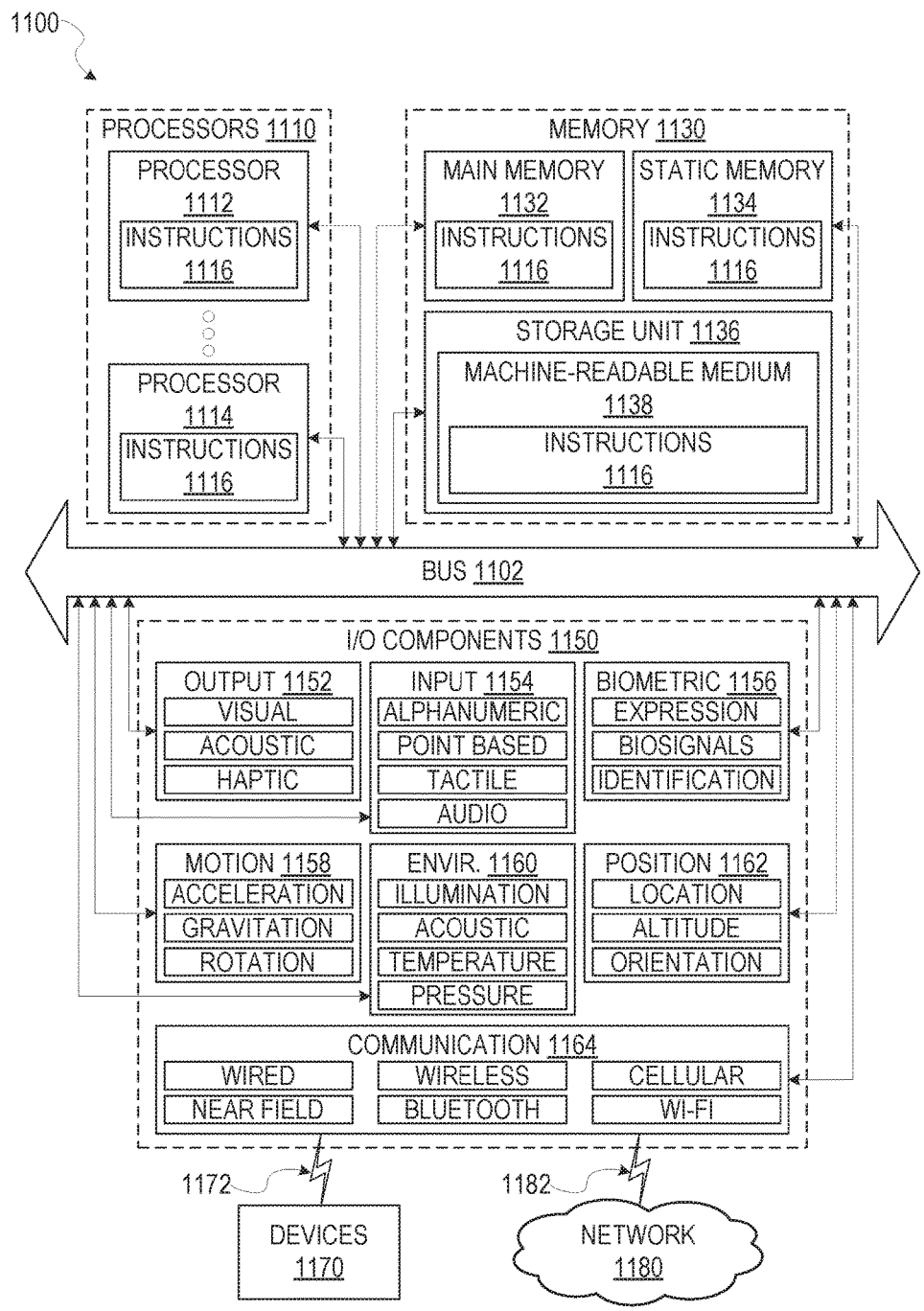
FIG. 11 is a block diagram presenting a diagrammatic representation of a machine in the form of a computer system within which a set of instructions may be executed for causing the machine to perform any of the methodologies discussed herein, according to an example embodiment.

FIG. 11 is a block diagram illustrating components of a machine 1100, according to some embodiments, able to read instructions (e.g., processor executable instructions) from a machine-readable medium (e.g., a non-transitory machine-readable storage medium) and perform any of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any of the methodologies discussed herein can be executed. In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device 900, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1112, 1114, the machine 1100 may include a single processor 1112 with a single core, a single processor 1112 with multiple cores (e.g., a multi-core processor 1112), multiple processors 1112, 1114 with a single core, multiple processors 1112, 1114 with multiples cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown in an example embodiment to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by processors of the machine 1100 (e.g., processors 1110), cause the machine 1100 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium should be considered as being transportable from one physical location to another. Additionally, since the machine-readable medium 1138 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and the operations may be performed in an order other than the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer implemented method, comprising:
receiving, by one or more processors of a client device, a set of images in a video stream, the set of images including at least a portion of a face, each pixel in the set of images having a first intensity value;
converting, by the one or more processors of the client device, one or more images of the set of images to a set of single channel images, the set of single channel images corresponding to a single channel associated with an aspect of the face;
generating a set of approximation images from the set of single channel images, the set of approximation images generated by, for each pixel, replacing a second intensity value with an approximation value, the second intensity value of a pixel being an intensity value of the pixel within a single channel image of the set of single channel images, the approximation value generated as a logarithm of the first intensity value and the second intensity value; and
generating a set of binarized images by thresholding the set of approximation images, wherein thresholding the set of approximation images is based on a threshold intensity value corresponding to a fractional luminance value of at least a portion of the set of images.

2. The method of claim 1, further comprising:
identifying an image capture mode from a set of image capture modes, each image capture mode of the set of image capture modes associated with an image processing task;
identifying a single channel associated with the image capture mode and the aspect of the face, the single channel selected from a set of single channels; and
in response to identifying the single channel, converting one or more images of the set of images to the set of single channel images by isolating one or more values for a set of pixels within the one or more images, the one or more values associated with the selected single channel.

3. The method of claim 1, wherein the set of single channels includes a red channel, a blue channel, a green channel, and a grayscale.

4. The method of claim 1 further comprising:
generating an integral representation for each single channel image of the set of single channel images by generating a summed area table for at least a portion of each single channel image of the set of single channel images.

5. The method of claim 4, wherein generating the set of approximation images further comprises:
identifying an image capture mode from a set of image capture modes;
identifying an original intensity value for a pixel within the set of images of the video stream;
selecting a pixel radius based on the image capture mode;
based on the summed area table and the selected pixel radius, generating the set of approximation images by replacing an intensity value of the pixel within one or more single channel images of the set of single channel images with an intensity average value for a set of pixels proximate to the pixel within the pixel radius; and
replacing the intensity average value for the pixel with an approximation value, the approximation value generated based on an original intensity value for the pixels within the set of images of the video stream and the intensity average value.

6. The method of claim 5, wherein selecting the pixel radius further comprises:
identifying an image capture mode from a set of image capture modes, each image capture mode of the set of image capture modes associated with an image processing task; and
based on the identified image capture mode, selecting the pixel radius from a set of pixel radii.

7. The method of claim 1, wherein generating the set of approximation images further comprises:
identifying an original intensity value for a pixel within the set of images of the video stream;
generating a blur intensity value for the pixel within one or more approximation images of the set of approximation images; and
replacing the blur intensity value for the pixel with an approximation value, the approximation value generated based on an original intensity value for the pixel and the blur intensity value for the pixel.

8. The method of claim 1, wherein generating the set of binarized images further comprises:
determining the threshold intensity value;
comparing an approximation value for one or more pixels within the set of approximation images with the threshold intensity value; and
modifying the approximation value for the one or more pixels to a first binary pixel value based on comparing the approximation value and the threshold intensity value.

9. The method of claim 1 further comprising:
determining an area of interest within one or more images of the set of images of the video stream;
converting the area of interest to a single channel area of interest;
generating an approximation area of interest from the single channel area of interest; and
generating a binarized area of interest images by thresholding the approximation area of interest.

10. A system, comprising:
one or more processor; and
a non-transitory machine-readable storage medium storing processor executable instructions that, when executed by the one or more processor, cause the one or more processor to perform operations comprising:
receiving, by the one or more processors of a client device, a set of images in a video stream, the set of images including at least a portion of a face;
converting, by the one or more processors of the client device, one or more images of the set of images to a set of single channel images, the set of single channel images corresponding to a single channel associated with an aspect of the face;
generating a set of approximation images from the set of single channel images, the set of approximation images generated by, for each pixel, relacing a second intensity value with an approximation value, the second intensity value of a pixel being an intensity value of the pixel within a single channel image of the set of single channel images, the approximation value generated as a logarithm of the first intensity value and the second intensity value; and
generating a set of binarized images by thresholding the set of approximation images, wherein thresholding the set of approximation images is based on a threshold intensity value corresponding to a fractional luminance value of at least a portion of the set of images.

11. The system of claim 10, wherein the operations further comprise:
identifying an image capture mode from a set of image capture modes, each image capture mode of the set of image capture modes associated with an image processing task;
identifying a single channel associated with the image capture mode and the aspect of the face, the single channel selected from a set of single channels; and
in response to identifying the single channel, converting one or more images of the set of images to the set of single channel images by isolating one or more values for a set of pixels within the one or more images, the one or more values associated with the selected single channel.

12. The system of claim 10, wherein the operations further comprise:
generating an integral representation for each single channel image of the set of single channel images by generating a summed area table for at least a portion of each single channel image of the set of single channel images.

13. The system of claim 12, wherein generating the set of approximation images further comprises:

identifying an image capture mode from a set of image capture modes;

identifying an original intensity value for a pixel within the set of images of the video stream;

selecting a pixel radius based on the image capture mode;

based on the summed area table and the selected pixel radius, generating the set of approximation images by replacing an intensity value of the pixel within one or more single channel images of the set of single channel images with an intensity average value for a set of pixels proximate to the pixel within the pixel radius; and replacing the intensity average value for the pixel with an approximation value, the approximation value generated based on an original intensity value for the pixels within the set of images of the video stream and the intensity average value.

14. The system of claim 13, wherein selecting the pixel radius further comprises:

identifying an image capture mode from a set of image capture modes, each image capture mode of the set of image capture modes associated with an image processing task; and based on the identified image capture mode, selecting the pixel radius from a set of pixel radii.

15. The system of claim 10, wherein generating the set of approximation images further comprises:

identifying an original intensity value for a pixel within the set of images of the video stream;

generating a blur intensity value for the pixel within one or more approximation images of the set of approximation images; and replacing the blur intensity value for the pixel with an approximation value, the approximation value generated based on an original intensity value for the pixel and the blur intensity value for the pixel.

16. The system of claim 10, wherein generating the set of binarized images further comprises:

determining the threshold intensity value;

comparing an approximation value for one or more pixels within the set of approximation images with the threshold intensity value; and modifying the approximation value for the one or more pixels to a first binary pixel value based on comparing the approximation value and the threshold intensity value.

17. The system of claim 10, wherein the operations further comprise:

determining an area of interest within one or more images of the set of images of the video stream;

converting the area of interest to a single channel area of interest;

generating an approximation area of interest from the single channel area of interest; and generating a binarized area of interest image by thresholding the approximation area of interest.

18. A non-transitory machine-readable storage medium storing processor executable instructions that, when executed by a processor of a machine, cause the machine to perform operations comprising:

receiving, by one or more processors of a client device, a set of images in a video stream, the set of images including at least a portion of a face;

converting, by the one or more processors of the client device, one or more images of the set of images to a set of single channel images, the set of single channel images corresponding to a single channel associated with an aspect of the face;

generating a set of approximation images from the set of single channel images, the set of approximation images generated by, for each pixel, relacing a second intensity value with an approximation value, the second intensity value of a pixel being an intensity value of the pixel within a single channel image of the set of single channel images, the approximation value generated as a logarithm of the first intensity value and the second intensity value; and generating a set of binarized images by thresholding the set of approximation images, wherein thresholding the set of approximation images is based on a threshold intensity value corresponding to a fractional luminance value of at least a portion of the set of images.

19. The non-transitory machine-readable medium of claim 18, wherein the operations further comprise:

identifying an image capture mode from a set of image capture modes, each image capture mode of the set of image capture modes associated with an image processing task;

identifying a single channel associated with the image capture mode and the aspect of the face, the single channel selected from a set of single channels; and in response to identifying the single channel, converting one or more images of the set of images to the set of single channel images by isolating one or more values for a set of pixels within the one or more images, the one or more values associated with the selected single channel.

20. The non-transitory machine-readable medium of claim 18, wherein the operations further comprise:

generating an integral representation for each single channel image of the set of single channel images by generating a summed area table for at least a portion of each single channel image of the set of single channel images;

identifying an image capture mode from a set of image capture modes;

identifying an original intensity value for a pixel within the set of images of the video stream;

selecting a pixel radius based on the image capture mode;

based on the summed area table and the selected pixel radius, generating the set of approximation images by replacing an intensity value of the pixel within one or more single channel images of the set of single channel images with an intensity average value for a set of pixels proximate to the pixel within the pixel radius; and replacing the intensity average value for the pixel with an approximation value, the approximation value generated based on an original intensity value for the pixels within the set of images of the video stream and the intensity average value.

* * * * *

UNITED STATES PATENT AND TRADEMARK OFFICE
CERTIFICATE OF CORRECTION

| | |
|---|---|
| PATENT NO. | : 10,051,253 B1 |
| APPLICATION NO. | : 14/973816 |
| DATED | : August 14, 2018 |
| INVENTOR(S) | : Yurii Monastyrshyn |

It is certified that error appears in the above-identified patent and that said Letters Patent is hereby corrected as shown below:

In the Claims

In Column 26, Line 31, in Claim 10, delete "relacing" and insert --replacing-- therefor In Column 28, Line 11, in Claim 18, delete "relacing" and insert --replacing-- therefor Signed and Sealed this
Eighteenth Day of June, 2019

Andrei Iancu
*Director of the United States Patent and Trademark Office*